July 15, 1952 H. O. ANGER 2,603,708

OVERLOAD SUPPRESSOR

Filed Jan. 29, 1946

*INVENTOR.*
HAL O. ANGER
*BY*
William D. Hall
*ATTORNEY*

Patented July 15, 1952 2,603,708

UNITED STATES PATENT OFFICE 2,603,708

OVERLOAD SUPPRESSOR

Hal O. Anger, Long Beach, Calif., assignor to the United States of America as represented by the Secretary of War Application January 29, 1946, Serial No. 644,170

2 Claims. (Cl. 178—44)

This invention relates in general to electrical circuits and in particular to means for the prevention of overloading of tuned amplifier circuits.

The invention is particularly applicable to pulse receivers used in direction finding systems of the prior art. Such receivers are of the superheterodyne type whose operation may be seriously affected by interfering continuous wave signals. The system is usually designed for operation in the ultra-high portion of the frequency spectrum to take advantage of improved directivity possible at these frequencies. Since allowance must be made for drifts in the operating frequency of the heterodyne oscillator and in the carrier frequency of the transmitted signal, the initial stages of such receivers generally have a wide pass band to assure reception of the desired direction finder signals. This bandwidth characteristic renders the receiver subject to interfering signals over a correspondingly wide range. When the interfering signal has a high intensity, compared with that of a desired pulse modulated direction finder signal, it causes overloading or blocking in the receiver to such an extent that the pulse modulated signals are not translated. In other words, the desired direction-finder signal is normally lost under the stated conditions.

It is, therefore, an object of this invention to prevent overload of the intermediate frequency amplifiers of a pulse receiver.

It is a further object of this invention to prevent such overloads from damaging the phosphor of intensity modulated indicator tubes generally utilized in systems of the nature described.

The invention comprises a rectifying element and resistor connected in series between the plate of an amplifier tube and a point which applies a small bias voltage to the crystal. The crystal becomes conductive and draws current when the plate signal reaches a predetermined voltage, and a portion of the plate signal is then dissipated in the crystal circuit.

For a better understanding of the present invention, together with other and further objects, advantages, and novel features thereof, reference is had to the following description taken in connection with the accompanying drawing, in which.

Figure 1:
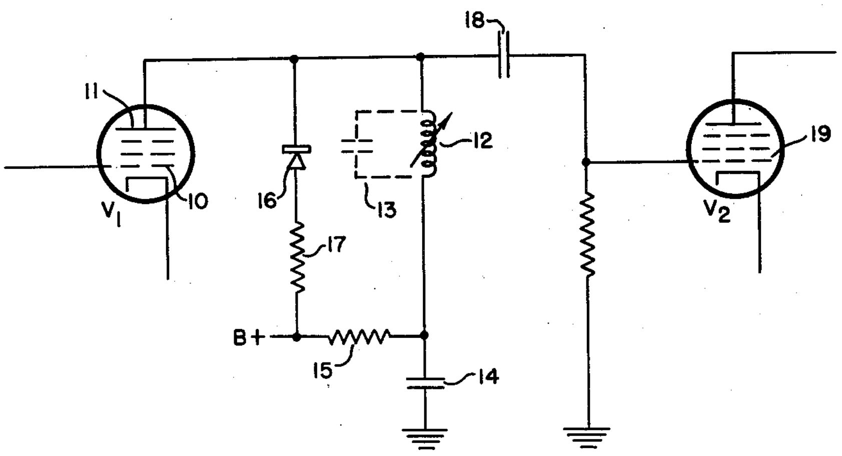
Fig. 1 is a circuit diagram embodying the principles of this invention.

Referring now more particularly to Fig. 1, there is connected to the plate 11 of tube $V_1$ the tuned circuit elements 12 and 13 which in turn are connected to ground through a decoupling condenser 14. Element 13 is here indicated in dashed lines as a capacitor, for in ultra-high-frequency operation it may in actuality be inter-electrode and distributed circuit capacitance. There is connected from B+ to the ground side of the tuned circuit a resistor 15. There is also connected to plate 11 a germanium crystal 16 which is connected to B+ through a resistor 17. The output of tube $V_1$ is coupled to the grid 19 of tube $V_2$ through coupling condenser 18.

In operation, a signal of normal amplitude applied to the grid 10 of tube $V_1$ produces an output signal of insufficient amplitude to block the succeeding stage $V_2$. During normal operation the voltage at plate 11 does not rise above B+ value. However, upon receipt of a very strong echo or interference signal at the grid 10 of tube $V_1$, the signal voltage at plate 11 can rise to a value exceeding B+ and of sufficient magnitude to block tube $V_2$. Upon receipt of such a signal, the signal voltage at the plate is sufficient to overcome the bias placed on crystal 16 by resistor 15, and a small amount of current then flows through crystal 16 and resistor 17. This may be regarded as causing dissipation of a portion of the signal, thereby attenuating the output signal to a value below the overload level.

Figure 2:
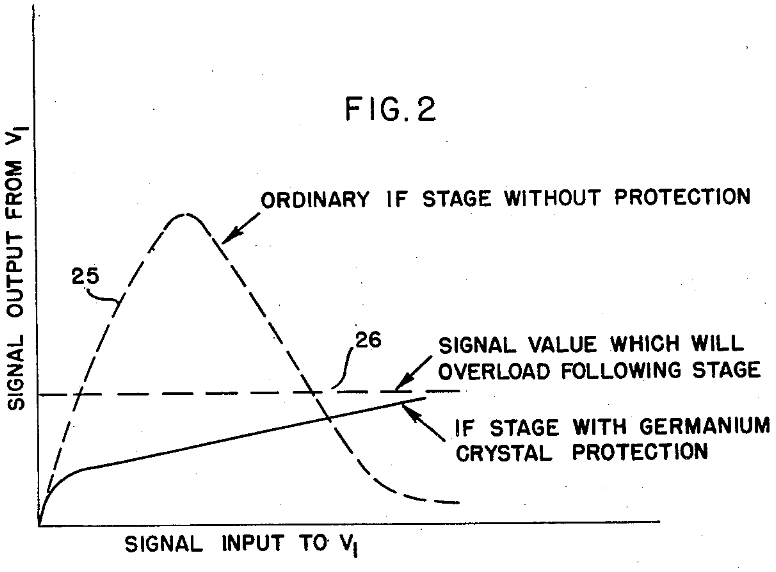
Fig. 2 is a graph showing the comparative characteristics of an intermediate frequency amplifier stage embodying this invention.

Curve 25 of the graphs in Fig. 2 indicates that as the input signal to an unprotected intermediate frequency amplifier stage is increased, the output signal increases to and beyond a level 26 at which overloading of the following intermediate frequency stages occurs. The output of a stage protected in according with the invention increases in the same manner at low levels, but the effective amplification is reduced at higher input levels. It is thus evident that the circuit herein set forth will attenuate abnormally large signals and prevent blocking of succeeding stages.

The values of resistors 15 and 17 should be so chosen that the signal applied to the grid 19 of tube $V_2$ is limited to a value which will not overload that stage. Typical circuit values for resistors 15 and 17 are 100 and 200 ohms respectively.

It will be obvious to those skilled in the art that other rectifying elements may be used in place of the germanium crystal here referred to, so long as the rectifying element has the low capacitance between terminals and high front-to-back resistance ratio which characterizes the germanium crystal.

While there has been described what is at present considered to be the preferred embodiment of this invention, it will be obvious to those skilled in the art that various changes and modifications may be made therein without departing from the scope of the invention as set forth in the appended claims.

What is claimed is:

1. In an electrical circuit including a vacuum tube having at least a cathode, a grid adapted to receive input signals, and a plate at which output signals are developed, a cathode circuit, a plate circuit, and a direct current power supply having positive and negative terminals connected between said plate and cathode circuits, the combination in said plate circuit including a rectifying circuit comprising a germanium crystal and a serially connected first biasing resistance, and a plate load circuit comprising a parallel tuned circuit and a serially connected second biasing resistance, said rectifying circuit and said plate load circuit being connected in parallel between said plate and said positive terminal and said germanium crystal and said parallel tuned circuit having a common junction connected to said plate, said germanium crystal being connected to be conducting when the potential at said plate exceeds the potential at said positive terminal, whereby input signal voltages of excessive values cause said germanium crystal to become conductive and correspondingly said rectifying circuit attenuates output voltages in excess of a predetermined value.

2. In an electrical circuit including a vacuum tube having at least a cathode, a grid adapted to receive input signals, and a plate at which output signals are developed, a cathode circuit, a plate circuit, and a direct current power supply having positive and negative terminals connected between said plate and cathode circuits, the combination in said plate circuit comprising a first branch including a first resistance in series with a unidirectional conducting element and a second branch including a second resistance in series with a parallel tuned circuit, said first and second branches being connected in parallel between said plate and said positive terminal, said unidirectional conducting element being connected to be conducting when the potential at said plate exceeds the potential at said positive terminal, whereby input signal voltages of excessive values cause said rectifying element to become conductive and correspondingly attenuate output voltages in excess of a predetermined value.

HAL O. ANGER.

REFERENCES CITED

The following references are of record in the file of this patent:

UNITED STATES PATENTS

| Number | Name | Date |
|---|---|---|
| 2,240,289 | Dillenburger et al. | Apr. 29, 1941 |
| 2,273,934 | Campbell | Feb. 24, 1942 |

OTHER REFERENCES

Article "On Contact Rectification by Metallic Germanium," by Ernest Merritt, Proc. Nat'l Academy of Sciences, vol. 11, 1925, pages 743–748. (Copy in Bureau Standards Library.)